United States Patent
Branscomb

(10) Patent No.: US 9,282,024 B2
(45) Date of Patent: Mar. 8, 2016

(54) PHYSICAL LAYER PROCESSING OF TIMESTAMPS AND MAC SECURITY

(71) Applicant: Microsemi Communications, Inc., Aliso Viejo, CA (US)

(72) Inventor: Brian Branscomb, Camarillo, CA (US)

(73) Assignee: Microsemi Communications, Inc., Aliso Viejo, CA (US)

(*) Notice: Subject to any disclaimer, the term of this patent is extended or adjusted under 35 U.S.C. 154(b) by 0 days.

(21) Appl. No.: 13/671,480

(22) Filed: Nov. 7, 2012

(65) Prior Publication Data

US 2013/0114601 A1 May 9, 2013

Related U.S. Application Data

(60) Provisional application No. 61/556,732, filed on Nov. 7, 2011.

(51) Int. Cl.
| | | |
|---|---|---|
| *H04L 12/701* | (2013.01) | |
| *H04L 12/741* | (2013.01) | |
| *H04J 3/06* | (2006.01) | |
| *H04L 29/06* | (2006.01) | |

(52) U.S. Cl.
CPC .............. *H04L 45/00* (2013.01); *H04J 3/0697* (2013.01); *H04L 45/74* (2013.01); *H04J 3/0667* (2013.01); *H04L 63/0428* (2013.01); *H04L 63/162* (2013.01)

(58) Field of Classification Search
CPC ....... H04L 45/00; H04L 45/74; H04L 63/162; H04L 63/0428; H04L 43/106; H04L 69/323; H04L 63/126; H04L 63/1458; H04L 9/0631; H04L 9/0637; H04L 9/3242; H04L 25/14; H04J 3/0697; H04J 3/0667; H04J 3/0661; Y04S 40/168

See application file for complete search history.

(56) References Cited

U.S. PATENT DOCUMENTS

| | | | |
|---|---|---|---|
| 7,860,125 B2 | 12/2010 | Bains et al. | |
| 2006/0136715 A1* | 6/2006 | Han et al. | 713/151 |
| 2008/0123555 A1 | 5/2008 | Qi et al. | |
| 2008/0130889 A1* | 6/2008 | Qi et al. | 380/257 |

(Continued)

FOREIGN PATENT DOCUMENTS

| | | | |
|---|---|---|---|
| EP | 2381622 A1 | 10/2011 | |
| WO | WO 2011-109539 A2 | 9/2011 | |

OTHER PUBLICATIONS

International Search Report on related PCT Application No. PCT/US2012/063983 from International Searching Authority (KIPO) dated Jan. 29, 2013.

(Continued)

*Primary Examiner* — Yee Lam
(74) *Attorney, Agent, or Firm* — Simon Kahn

(57) ABSTRACT

A physical layer device provides both timestamp processing and security processing. The timestamp processing may be PTP processing according to IEEE Std. 1588 and/or OAM processing according to ITU-T Recommendation Y.1731. The security processing may be MACsec processing according to IEEE Std. 802.1AE. The timestamp processing may delay some packets to avoid impairing accuracy of timing information. For example, the accuracy of timing information could be impaired when a packet containing the timing information is delay due to additional bits added to a preceding packet to include a security tag and integrity check value.

18 Claims, 4 Drawing Sheets

(56) References Cited

U.S. PATENT DOCUMENTS

| | | | |
|---|---|---|---|
| 2009/0185501 A1* | 7/2009 | Huang et al. | 370/252 |
| 2009/0190589 A1* | 7/2009 | Bains et al. | 370/392 |
| 2009/0190613 A1* | 7/2009 | Finn | 370/509 |
| 2009/0310572 A1* | 12/2009 | Wang et al. | 370/336 |
| 2010/0046552 A1* | 2/2010 | Jung et al. | 370/474 |
| 2010/0049964 A1* | 2/2010 | Kondapalli et al. | 713/150 |
| 2010/0229013 A1* | 9/2010 | Diab et al. | 713/323 |
| 2010/0309787 A1* | 12/2010 | Diab et al. | 370/236 |
| 2014/0092918 A1* | 4/2014 | Jost | H04J 3/0661 370/465 |

OTHER PUBLICATIONS

Written Opinion on related PCT Application No. PCT/US2012/063983 from International Searching Authority (KIPO) dated Jan. 29, 2013.

Tal Mizrahi, "Time Synchronization Security using IPsec and MACsec," IEEE, Sep. 12-16, 2011.

Extended European Search Report (EESR) on related European Application No. 12848224.7 from the European Patent Office (EPO) dated Feb. 13, 2015.

* cited by examiner

PHYSICAL LAYER PROCESSING OF TIMESTAMPS AND MAC SECURITY

CROSS REFERENCE TO RELATED APPLICATIONS

This application claims the benefit of U.S. Provisional Application No. 61/556,732, filed on Nov. 7, 2011, the disclosure of which is incorporated herein by reference.

BACKGROUND OF THE INVENTION

The present invention relates generally to processing timestamps in communication packets and, more particularly, to processing timestamps in communication networks that include media access control security.

It may be advantageous in a networked system for devices in the network to include timestamp information in some communication packets. The timestamp information may be indicative of when a packet is transmitted or received by one of the devices. The timestamp information may be used, for example, to synchronize clocks between devices in the network. The timestamp information may also be used for operation, administration, and maintenance functions in the network. The electronics industry has developed several standard protocols that use timestamped packets, for example, the Precision Time Protocol (PTP) of IEEE Std. 1588 and ITU-T Recommendation Y.1731 on Internet protocol aspects—Operation, administration and maintenance.

It may also be advantageous to secure at least some communication in a network to avoid interception of information or disruption of network operations. Some information may be protected by encrypting the information at its source and decrypting it at its destination. Other information may be protected by inclusion of a check value or digital signature that allows a receiving device to confirm that the information has not been altered since it was sent from a transmitting device. One protocol for increasing network security is Media Access Control (MAC) Security of IEEE Std. 802.1AE.

It may be further advantageous for a network to provide both timestamp information and increased security. However, security measures may interfere with timestamp information by, for example, increasing uncertainty with respect to the timing information, which in many cases should also be subject to the security measures. Reducing effects of security measures on timing information may be difficult, however, particularly without unduly reducing bandwidth of a communication system.

BRIEF SUMMARY OF THE INVENTION

Some aspects of the present invention provide a method performed by a physical layer communication device implemented using electronic circuitry, the method comprising: receiving a packet for transmission; determining whether the packet is a packet that is to receive timestamp processing; if the packet is to receive timestamp processing, determining a value indicative of a time of transmission of the packet to a communication network; if the packet is to receive timestamp processing, delaying the packet for a time interval determined to avoid having the packet incur a variable delay during subsequent processing due to MACsec processing of a prior packet; and transmitting the packet over the communication network.

Another aspect of the invention provides a method performed by a physical layer device (PHY) comprising a transmit chain including a transmitter, a MACsec processing block, a timestamp processing block, and a flow control block, the method comprising: buffering packets for transmission by the flow control block; determining, by the timestamp processing block, whether packets for transmission are packets subject to timestamp processing; providing, by the timestamp processing block, for the packets subject to timestamp processing, an indication of predicted time of transmission of the packet from the PHY; delaying, by the timestamp processing block, provision to the MACsec processing block of packets subject to timestamp processing so as to reduce inaccuracy of the predicted time of transmission; performing, by the MACsec processing block, MACsec operations on at least some of the packets; and transmitting, by the transmitter, the packets.

Another aspect of the invention provides a physical layer device, comprising: a transmit chain including a transmit flow control block, a transmit timestamp processing block, a transmit MACsec processing block, and a transmitter; a receive chain including a receiver, a receive MACsec processing block, a receive timestamp processing block, and a receive flow control block; and wherein the transmit timestamp processing block is configured to determine whether a packet is subject to timestamp processing, and delay provision of the packet to the transmit processing block if and only if the packet is determined to be subject to timestamp processing.

Another aspect of the invention provides a physical layer device, comprising: means for receiving a packet for transmission; means for determining whether the packet is a packet that is to receive timestamp processing; means for, if the packet is to receive timestamp processing, determining a value indicative of a time of transmission of the packet to a communication network; means for, if the packet is to receive timestamp processing, delaying the packet for a time interval determined to avoid having the packet incur a variable delay during subsequent processing due to MACsec processing of a prior packet; and means for transmitting the packet over the communication network.

Another aspect of the invention provides a communication network device including a physical layer device (PHY), a media access controller (MAC), and a packet processing module, the PHY comprising: means for receiving a packet for transmission; means for determining whether the packet is a packet that is to receive timestamp processing; means for inserting a value into the packet indicative of a time of transmission of the packet to a communication network if the packet is to receive timestamp processing; means for delaying the packet for a time interval determined to avoid having the packet incur a variable delay during subsequent processing due to MACsec processing of a prior packet if the packet is to receive timestamp processing; and means for transmitting the packet over the communication network.

These and other aspects of the invention are more fully comprehended upon review of this disclosure.

DETAILED DESCRIPTION

Figure 1:
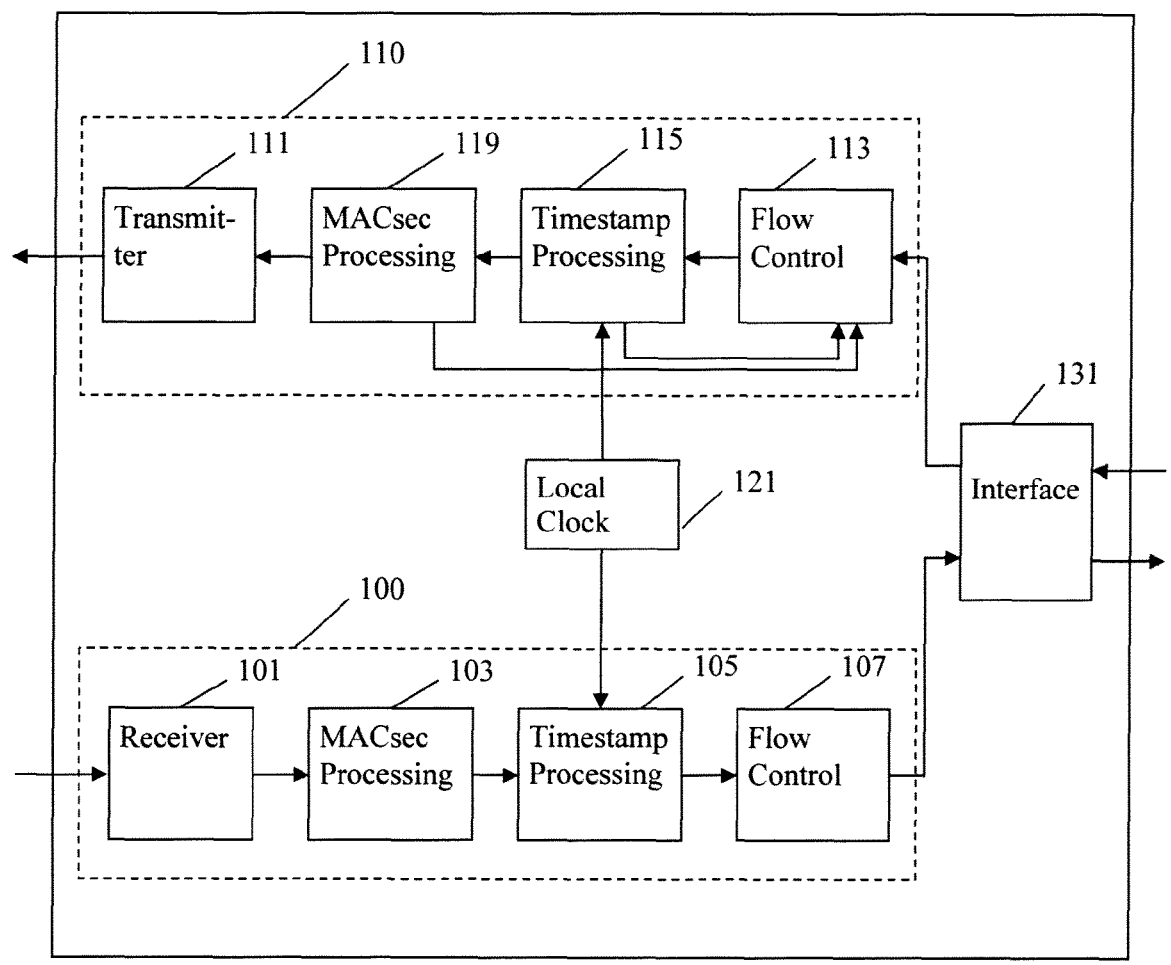
FIG. 1 is a block diagram of physical layer communication device in accordance with aspects of the invention.

FIG. 1 is a block diagram of a physical layer communication device (PHY) in accordance with aspects of the invention. The PHY includes a receive block 100 to receive an input signal from a communication network and a transmit block 110 to transmit an output signal to the communication network. A local clock 121 may be included in the PHY to provide a timebase for the PHY and supply time values to the receive block and the transmit block. The receive and transmit blocks provide both timestamp processing and MAC security (MACsec) processing. The PHY also includes an interface block 131 for coupling to a higher-level device, such as a media access control device. In some embodiments, other processing blocks may also be included in the signal paths between the receive block and the interface block and between the transmit block and the interface block. The blocks of the PHY are generally implemented with electronic circuitry. As one of skill in the art would understand, the PHY may be implemented as a stand-alone device or as part of a higher layer device that contains the PHY or parts thereof. For example, in one embodiment the PHY is provided in an integrated circuit. Software programming may be used to control operation of some circuitry in the PHY. A programmable processor may be used to configure the circuitry of the PHY and to handle exception conditions.

The transmit block 110 generally receives packets for transmission, buffers the packets, performs timestamp processing for appropriate packets, performs MACsec processing for appropriate packets, and transmits the packets. In various embodiments the transmit block may also perform other functions commonly performed in a transmit chain of a PHY. In addition, in some embodiments the transmit block also pauses packets for flow control purposes in response to receipt of a valid PAUSE frame requesting a pause in transmission in packets by the receive block 100. In the embodiment shown in FIG. 1, a transmit flow control block 113 performs the buffering of packets, a transmit timestamp processing block 115 performs the timestamp processing for appropriate packets, a transmit MACsec processing block 119 performs MACsec processing for appropriate packets, and a transmitter 111 transmits the packets.

The transmit flow control block 113 receives packets to be transmitted from the PHY and buffers the packets. As shown in FIG. 1 the transmit flow control block 113 receives packets from the interface block 131. The transmit flow control block buffers the packets, for example to account for differences in rates between a rate of a higher-level device and a rate of transmission from the transmit block 110. For example, the reception and transmission may occur at the same nominal bit rate, but the transmit MACsec processing block 119 may add additional bits to packets that slow packet transmission. Additionally, the transmit timestamp processing block 115 may delay transmission of packets. The transmit flow control block 113 may receive indications from the transmit MACsec processing block 119 and the transmit timestamp processing block 115 that data transmission is extended. Alternatively, the transmit flow control block 113 may receive an indication that transmission may proceed. The transmit flow control block 113 may signal the higher-level device to pause or slow supplying packets to the PHY. In some embodiments, the signaling occurs by way of the receive block 100, with for example the transmit flow control block 113 providing signals to a receive flow control block 107 of the receive chain. In addition, in some embodiments the transmit flow control block delays transmission of packets in response to an indication that a PAUSE frame requesting a pause in transmission of packets has been received. In some of these embodiments control packets, however, are not so delayed. In various embodiments the transmit flow control block receives the indication from the receive block and/or from a higher level by way of the interface block 131. Pausing packets for flow control purposes in the transmit chain prior to calculating and writing timestamp values may be beneficial in assisting in maintaining accuracy of timestamp information.

The buffered packets are received by the transmit timestamp processing block 115. The transmit timestamp processing block 115 adds, in some of the packets, an indication of the time the packet is transmitted from the PHY.

The transmit timestamp processing block 115, for each packet received from the transmit flow control block 113, determines, for example, using addresses and tags in the packet, whether the packet is one for which timestamp processing will be performed. The timestamp processing generally utilizes the time, as indicated by the local clock 121, that the packet will be transmitted. For various packets, the time of transmission may be inserted in the packet, added or subtracted to a value in the packet, or supplied to the higher-layer device.

The transmit timestamp processing block 115 may predict the time of transmission by adjusting a time value from the local clock based on expected delays related to or in the transmit MACsec processing block 119 and the transmitter 111. In some embodiments the transmit timestamp processing block may adjust the time value by a fixed amount for packets subject to MACsec processing. The delay incurred by a timestamped packet in the transmit MACsec processing block 119 may depend on what processing the transmit MACsec processing block 119 performs on a preceding packet. For example, the transmit MACsec processing block 119 may add bits to the preceding packet, and in some embodiments perform operations on information of the packet, for example encryption processing, that otherwise delays the packet, and possibly delays processing of the subsequent packet. Accordingly, the transmit timestamp processing block 115 may delay supplying an already timestamped packet to the transmit MACsec processing block 119, and account for that delay in determining a timestamp value, so that the added bits, and/or other delays, do not cause a delay in transmission that would reduce accuracy of the predicted time of transmission. In some embodiments all timestamped packets, but not non-timestamped packets, are so delayed, without regard to whether the preceding packet in the transmit chain is modified or to be modified by MACsec processing. In some embodiments the delay of packets subject to timestamping may be performed after determination that a packet is to be timestamped, but prior to timestamping of the packet, such that delay of a packet by the timestamp processing block need not be accounted for in determining timestamp values. The transmit timestamp processing block 115 may also signal the transmit flow control block 113 when a packet is delayed.

The transmit MACsec processing block 119 receives the packets from the timestamp processing block 115. The transmit MACsec processing block 119 performs, for some of the packets, security related processing, such as encryption. The transmit MACsec processing block 119, for each packet received from the transmit timestamp processing block 115, determines, for example, based on addresses and tags in the packet, whether the packet is one for which MACsec processing will be performed. For packets subject to MACsec processing, the MACsec processing generally adds a security tag to a packet and utilizes a cipher to generate and add an integrity check value (ICV) to the packet for use at a receiver to verify that the packet has not been modified. The MACsec processing may also encrypt payload data in the packet. The addition of the security tag and ICV increases the size of the MACsec processed packet so that a following packet may be delayed by the time used to transmit the additional bits, and possibly also delayed due to time required for, for example, encryption processing. The delay incurred may vary with the gap between packets provided to the MACsec processing block, with the delay decreasing as the gap between the packets increases. For example, if the following packet were separated from the MACsec processed packet by a minimum allowed gap, the delay would be large, and if the following packet were separated from the MACsec processed packet by at least the minimum allowed gap plus the number of bits added by the MACsec processing, no additional delay would be incurred.

The transmitter 111 is coupled to the communication link, for example, a fiber optic cable or other communication medium in the communication network, to transmit the output signal. The transmitter 111 processes the packets from the transmit MACsec processing block 119 to produce the output signal. In many embodiments, the output signal is transmitted according to a standard format, for example, a standard for Ethernet.

The receive block 100 generally include blocks that correspond to the blocks of the transmit block 110. A receiver 101 is coupled to a communication link, for example, another fiber optic cable in the communication network, and thereby receives the input signal. In many embodiments, the input signal is received according to the same standard format as used for the output signal from the transmitter 111. The receiver 101 processes the input signal to recover data from the input signal and produces data packets. In various embodiments, the receiver 101 also determines starts of the packets, for example, by determining that frame delimiter signals or frame synchronization signals have been received.

A receive MACsec processing block 103 receives packets from the receiver 101. For each packet, the receive MACsec processing block 103 may determine if a packet is subject to MACsec processing and, if so, perform MACsec processing for the packet. The MACsec processing uses a security tag and ICV in the packet to verify integrity of the packet. The packet may also be decrypted. In some embodiments the receive MACsec processing block performs additional MAC related processing. For example, in some embodiments the receive MACsec processing block also determines if a valid PAUSE frame has been received by the receive block 100. If so, the receive MACsec processing block provides a signal indicative of receipt of a valid PAUSE frame and in most embodiments information of a length of a requested pause time indicated by the PAUSE frame. The signal is provided to the transmit block 110, in some embodiments directly and in some embodiments by way of being passed to the receive flow control block 107. Performing PAUSE frame reception related processing in the PHY, particularly soon after reception, may be beneficial in reducing numbers of packets transmitted after receipt of a PAUSE frame requesting a pause in transmission, or in earlier recommencing of transmission of packets if the PAUSE frame indicates, usually by way of a zero value, that transmission of packet should no longer be paused.

A receive timestamp processing block 105, for each packet received from the receive MACsec processing block 103, determines, for example, using addresses and tags in the packet, whether the packet is one for which timestamp processing will be performed. The timestamp processing generally utilizes the time, as indicated by the local clock 121, that the packet was received. For various packets, the time of reception may be inserted in the packet, added or subtracted to a value in the packet, or supplied to the higher-layer device. The receive timestamp processing block 105 may adjust time values from the local clock based on delays in the receiver 101 and receive MACsec processing block 103 for use as the time of reception. In some embodiments the receive timestamp processing block adjusts time values based on delays in the receive MACsec processing block by a fixed amount for packets subject to MACsec processing.

The receive flow control block 107 receives packets from the receive timestamp processing block 105 and transmits the packets to the interface block 131. The flow control block 107 buffers the packets to match rates that may differ between reception and transmission. For example, in some embodiments, the reception and transmission may occur at the same nominal bit rate, but with specific bit rates that vary from the nominal rate by different amounts. Additionally, the receive flow control block 107 may supply signals to the higher-layer device to indicate flow control in the transmit path 110. In addition, in some embodiments the receive flow control block receives a signal from the receive MACsec processing block regarding receipt of a valid PAUSE frame, and the receive flow control block provides information of the PAUSE frame to the transmit flow control block 113 and/or to the interface block 131 for use by higher level processes.

The local clock 121 generally provides time values that are synchronized or syntonized to another clock in the communication network. In some embodiments, the PHY may receive time from a clock external to the PHY.

Figure 2:
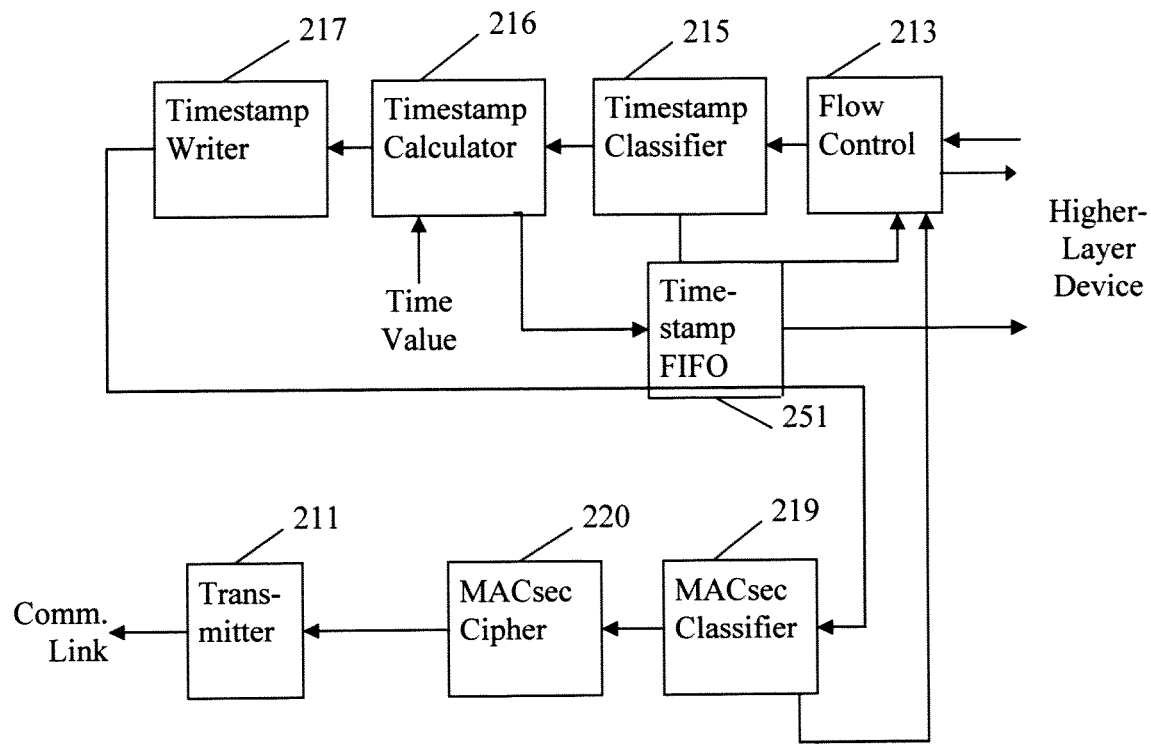
FIG. 2 is a block diagram of a transmit path for a physical layer communication device in accordance with aspects of the invention.

FIG. 2 is a block diagram of a transmit path for a physical layer communication device in accordance with aspects of the invention. The transmit path may, in some embodiments, be the transmit path in the PHY of FIG. 1. Accordingly, the transmit path of FIG. 2 receives packet from a higher-layer for transmission and transmits the packets, after processing, to a communication link. Processing that may be performed includes timestamp processing and MACsec processing.

The transmit path includes a flow control block 213 that receives the packets to be transmitted. The flow control block 213 rate buffers the packets and supplies them to a timestamp classifier 215. The timestamp classifier 215 determines whether the packets are to receive timestamp processing and what type of processing. A timestamp calculator 216 calculates timestamp values related to transmission times of the packets, and a timestamp writer 217 may write the calculated timestamp values into the packets. A MACsec classifier 219 determines whether the packets are to receive security processing and what type of processing. A MACsec cipher block 220 performs the security processing and supplies the packets to a transmitter 211 that outputs a physical signal to the communication link.

The flow control block 213 is similar to or in some embodiments that same as the transmit flow control block of FIG. 1. Accordingly, the flow control block 213 buffers the packets it receives to match rates that may differ between reception from the higher-level device and transmission from the transmitter 211. The rates may differ, for example, due to different tolerances between rates that are nominally equal, bits added to packet for security processing, or delays added for timestamp processing. The flow control block 213 may signal the higher-level device to pause or slow supplying packets for transmission.

The timestamp packet classifier 215 classifies the packets according to what type, if any, timestamp action is to be performed. In one embodiment, the packets are classified to be one of five types. A first type includes packets that are not to receive timestamp processing in the transmit path. A second type includes packets that are to have a transmission time value written into the packet. A third type includes packets that are to have a timestamp in the packet modified by subtracting the transmission time value and adding an offset value. A fourth type includes packets that are to have a timestamp in the packet modified by adding the transmission time value and adding an offset value. A fifth type includes packets for which the transmission time value is to be supplied to the higher-layer device. In some embodiments, a timestamp FIFO is used to supply the transmission time values to the higher-layer device. Packets may be classified using values of source and destination addresses in the packets. In some embodiments, the timestamp packet classifier 215 classifies packets according to values of addresses and/or tags in the packets. For example, some of the packets may contain tags for virtual local area networking (VLAN) and/or for multi-protocol label switching (MPLS). Additionally, packets, in some embodiments, may be classified using messages contained in the packets, such as precision time protocol or operations, administration, and maintenance messages. Furthermore, packet classification may use combinations of packet characteristics.

The timestamp packet classifier 215 may delay supplying packets that are classified to receive processing to the timestamp calculator 216. In some embodiments, however, the delay may be provided subsequent to writing of the timestamp, with for example the timestamp writer 217 instead providing the delay, and with the timestamp calculator 216 taking account of such a delay. The delay is to avoid variation in transmission time, with respect to a timestamp value, that may occur due to MACsec processing. In one embodiment, the timestamp packet classifier 215 delays packets that will receive timestamp processing to allow transmission of a maximum number of bits that may be added to packets by MACsec processing of a preceding packet, and, in some embodiments, an amount of additional time that may be required by MACsec processing of the preceding packet, for example additional time due to encryption processing. In another embodiment, packets are delayed by an amount that provides a gap between a timestamped packet and the preceding packet of at least a minimum gap between packets plus the maximum number of bits that may be added to the preceding packet for MACsec processing. The timestamp packet classifier 215, in many embodiments, signals the flow control block 213 when packets are delayed for timestamp processing.

The timestamp calculator 216 produces a new timestamp value depending on the classification of the packet. For many packet classifications, the timestamp calculator 216 uses time values supplied to the timestamp calculator 216. The time values may be supplied by a clock such as the local clock of the PHY of FIG. 1. Since transmission time may be defined by when a specific part of the packet (for example, the end of an Ethernet start of frame delimiter) enters the communication link from the transmitter 211, the timestamp calculator 216 adjusts the time values for delays expected in subsequent blocks of the transmit path. In some embodiments the timestamp calculator adjusts the time values by a fixed amount to account for MACsec processing. However, due to delays provided by the timestamp packet classifier 215, the timestamp calculator 216 may provide accurate timestamp information without adjusting for variable delays caused by MACsec processing, if the packet to be time stamped is delayed by the timestamp packet classifier. In embodiments in which a timestamped packet is delayed to allow for MACsec processing of a preceding packet after timestamp writing, the timestamp calculator also accounts for that delay.

The timestamp writer 217 may write the new timestamp value from the timestamp calculator 216 to a location in the packet. The location written may vary depending on the format of the packet and the classification of timestamp processing. For example, the location of a PTP packet's correction field. In one embodiment, the receive packet writer 107 additionally updates checksum fields in packets that have timestamp values written.

The MACsec packet classifier 219 classifies the packets according to what type, if any, security processing is to be performed. For example, some packets may be classified to have an ICV added to allow integrity checking of the packet, other packets may be classified to be encrypted, and other packets may be classified to receive no MACsec processing. Packets may be classified using values of source and destination addresses in the packets. In some embodiments, the MACsec packet classifier 219 classifies packets according to values of tags in the packets, such as VLAN or MPLS tags. Packet classification may use combinations of packet features. Packets that receive MACsec processing have additional bits added to the packets, accordingly the MACsec packet classifier 219 may signal the flow control block 213 so that it may adequately buffer the packets it receives from the higher-layer device including, in some cases, signaling the higher-layer device to defer supplying packets to the transmit path.

The MACsec cipher block 220 performs security processing according to the classifications provided by the MACsec packet classifier 219. A security tag is added to the packets that receive security processing. The security tag may be formatted according to IEEE Std. 802.1AE. Various packets have integrity check values added for use at a receiver to verify that the packet has not been modified. The MACsec processing may also encrypt payload data in the packet. Additionally, the MACsec cipher block 220 may recalculate checksum fields for packets that receive security processing. In some embodiments, the MACsec cipher block 220 recalculates checksum fields for packets that had timestamp values written by the timestamp writer 217.

The transmitter 211 receives packets from the MACsec cipher block 220 and supplies the output signal to the communication link coupled to the transmit path. The transmitter 211 is similar to or in some embodiments that same as the transmitter of FIG. 1. The blocks of the transmit path may operate on a packet concurrently with one part of the packet in one of the blocks while another part of the packet is in another one of the blocks.

Figure 3:
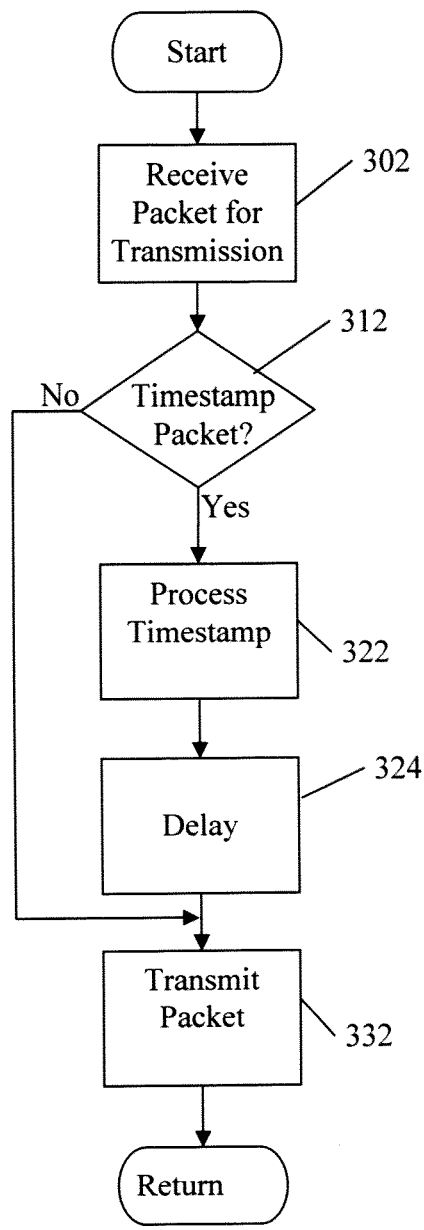
FIG. 3 is a flowchart of a process for handling timing information in accordance with aspects of the invention.

FIG. 3 is a flowchart of a process for handling timing information in accordance with aspects of the invention. The process may be implemented by a PHY device, for example, the device of FIG. 1.

In block 302, the process receives a packet for transmission. The packet may be received from a higher-layer device, for example, a media access controller.

In block 312, the process determines whether the packet is a packet that will receive timestamp processing. Whether a packet will receive timestamp processing may be determined utilizing values of source and destination addresses in the packet. In some embodiments, the process may utilize the values of tags, such as VLAN or MPLS tags, in the packets. Additionally, in some embodiments, the process may utilize a message contained in the packets, such as a precision time protocol or operations, administration, and maintenance message. Furthermore, the process may determine whether the packet is a packet that will receive timestamp processing utilizing a combination of packet features. If the packet is a packet that will receive timestamp processing, the process continues to block 322; otherwise, the process continues to block 332.

In block 322, the process processes the packet according to a timestamp protocol. For example, the process may insert a value into the packet indicative of when the packet is transmitted to a communication network. The transmission time may be determined by adjusting a time value from a clock to compensate for delays incurred by the packet subsequent to timestamp processing. For example, the packet may be delayed by a MACsec processing block and a transmitter in a PHY as shown in FIG. 1, and a delay as discussed with respect to block 324.

In block 324, the process delays for a time interval. The delay is of a length determined so as to avoid having the packet incur a variable delay in subsequent processing that would impair accuracy of the timestamp processing performed in block 322. For example, when the packet is transmitted via a block that performs MACsec processing, the packet may be delayed by an amount that depends on the MACsec processing performed on a preceding packet. In one embodiment, the delay length corresponds to a time for transmission of a maximum number of bits that may be added to the preceding packet for MACsec processing. In another embodiment, the delay length corresponds to a time that provides a minimum gap from the preceding packet after the maximum number of bits that may be added to the preceding packet for MACsec processing. In some embodiments the process performs operations of block 324 prior to performing operations of block 322, in which case the operations of block 322 would not account for the delay provided by the operations of block 324.

In block 332, the process transmits the packet on a communication link. The packet may be transmitted by way of a block that performs MACsec processing. The process thereafter returns.

Figure 4:
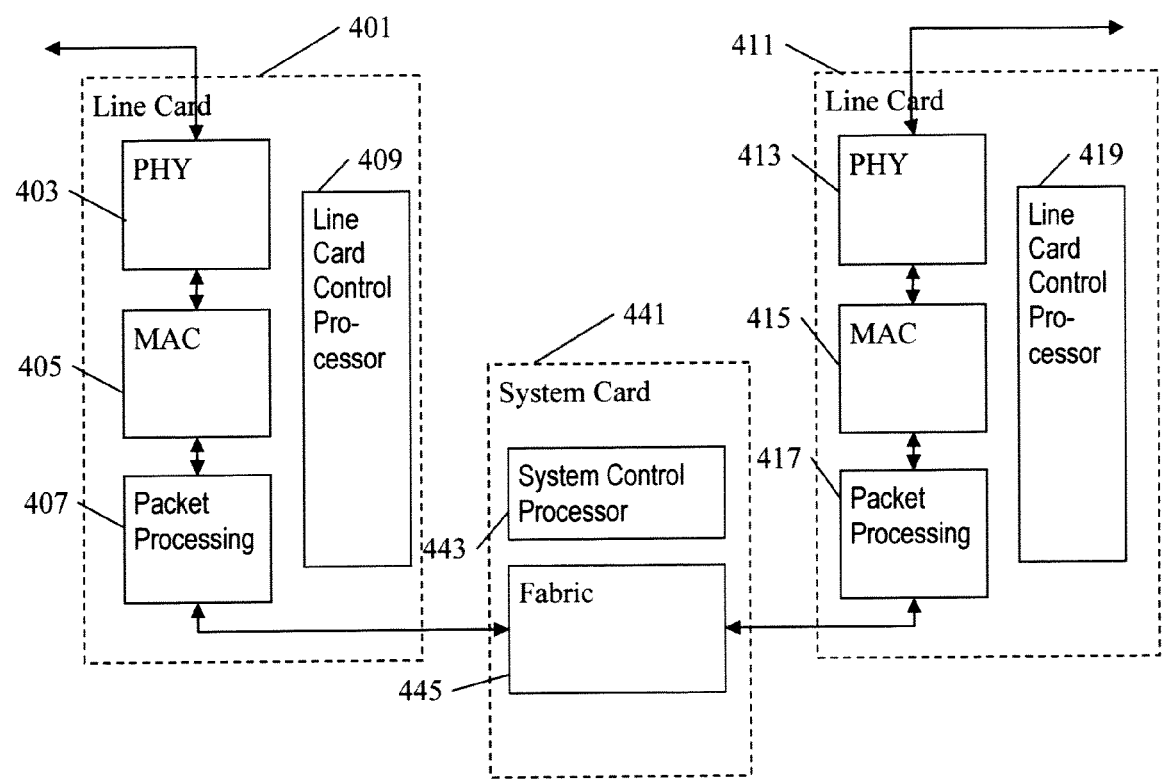
FIG. 4 is a block diagram of a communication network device in accordance with aspects of the invention.

FIG. 4 is a block diagram of a communication network device in accordance with aspects of the invention. The device includes a first line card 401 and a second line card 403. The first line card includes a PHY 403 that provides timestamp processing and MACsec processing. The PHY may be a PHY as described with reference to FIG. 1. The PHY is coupled to a MAC 405 which is coupled to a packet processing module 407. Operation of the first line card is controlled and monitored by a line card control processor 409. The second line card 411 includes corresponding blocks and in some embodiments is the same as the first line card. FIG. 4 shows two line cards but a system may include many more line cards.

The PHYs 403, 413 of the first and second line cards 401, 411 may include a transmit path as described with reference to FIG. 2. The PHYs provide timestamp processing that includes delaying timestamped packets so that variable delays that the packets may incur due to the MACsec processing do not impair accuracy of timestamp information.

A system card 441 is coupled to the first and second line cards. A switch fabric 445 couples the line cards and switches packets between line cards. A system control processor 443 controls and monitors operation of the system card.

Although the invention has been discussed with respect to various embodiments, it should be recognized that the invention comprises the novel and non-obvious claims supported by this disclosure.

What is claimed is:

1. A method performed by a physical layer communication device implemented using electronic circuitry, the method comprising:
  receiving a packet for transmission;
  determining whether the packet is a packet that is to receive timestamp processing;
  if the packet is to receive timestamp processing, determining a value indicative of a time of transmission of the packet to a communication network;
  if the packet is to receive timestamp processing, inserting the value indicative of the time of transmission in to the packet;
  if the packet is to receive timestamp processing, after determining the value indicative of the time of transmission, and after inserting the value indicative of the time of transmission into the packet, delaying the packet for a time interval to avoid having the packet incur a variable delay during subsequent processing due to Media Access Control Security (MACsec) processing of a prior packet, wherein the time interval is based on a time of transmission of a maximum number of bits that may be added to the prior packet for the MACsec processing; and
  transmitting the packet over the communication network.

2. The method of claim 1, wherein the time interval corresponds to a time that provides a minimum from the prior packet after the maximum number of bits that may be added to the prior packet for the MACsec processing.

3. The method of claim 1, wherein the packet is received from a media access controller.

4. The method of claim 1, wherein the determining whether the packet is a packet to receive time stamp processing utilizes values of source and destination addresses in the packet.

5. The method of claim 1, wherein the determining whether the packet is a packet to receive time stamp processing utilizes values of tags in the packet.

6. The method of claim 1, further comprising signaling transmit flow control circuitry when the packet is delayed.

7. The method of claim 1, wherein the MACsec processing includes adding a security tag to the packet, and adding an integrity check value (ICV) to the packet.

8. The method of claim 7, wherein the MACsec processing further includes encrypting at least payload data in the packet.

9. The method of claim 1, further comprising providing the value indicative of time of transmission of the packet to a higher level device.

10. The method of claim 1, further comprising inserting into the packet the value indicative of the time of transmission of the packet.

11. The method of claim 1, further comprising:
  determining if a received further packet, received from the communication network, is subject to the MACsec processing;
  performing the MACsec processing of the received further packet; and
  adjusting a time value from a local clock based on delays in performing the MACsec processing to provide a time of reception for the received further packet.

12. The method of claim 11, wherein the time value is adjusted by a fixed amount.

13. A method performed by a physical layer device (PHY) comprising a transmit chain including a transmitter, a Media Access Control Security (MACsec) processing block, a timestamp processing block, and a flow control block, the method comprising:
  buffering packets for transmission by the flow control block;
  determining, by the timestamp processing block, whether packets for transmission are packets subject to timestamp processing;
  timestamping the packets subject to timestamp processing by providing, by the timestamp processing block, for the packets subject to timestamp processing, an indication of predicted time of transmission of the packets from the PHY, including inserting the predicted time of transmission into the packets, wherein the predicted time of transmission is based on a current time and expected delays in the MACsec processing block and the transmitter;

subsequent to timestamping the packets, delaying, by the timestamp processing block, provision to the MACsec processing block of each of the timestamped packets for a time interval so as to reduce inaccuracy of the predicted time of transmission, wherein the time interval is based on a time of transmission of a maximum number of bits that may be added to a respective prior one of the timestamped packets for MACsec processing;

performing, by the MACsec processing block, the MACsec processing on at least some of the packets; and transmitting, by the transmitter, the packets.

14. The method of claim 13, wherein the indication of predicted time of transmission of the packets is provided to a higher level device.

15. The method of claim 13, wherein the indication of predicted time of transmission of the packets is provided in the packet.

16. The method of claim 13, further comprising providing, by the timestamp processing block, an indication that data transmission is extended.

17. The method of claim 13, wherein the MACsec processing include adding an integrity check value (ICV) to the packets.

18. The method of claim 17, wherein the MACsec processing include encrypting data of the packets.

* * * * *